Figure 1:
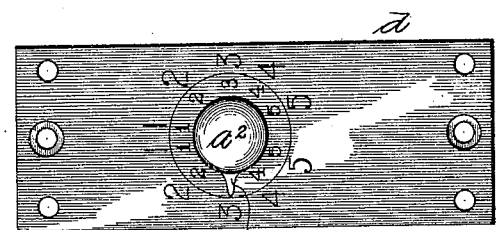

No. 855,168. PATENTED MAY 28, 1907.
O. F. FORSBERG & J. A. BIRSFIELD.
SIGNALING KEY.
APPLICATION FILED OCT. 27, 1902.

6 SHEETS—SHEET 1.

Witnesses:
J. H. Skinkle
W. H. Leach

Inventors:
Oscar F. Forsberg,
Jules A. Birsfield,
By George A. Berton
Attorney.

No. 855,168. PATENTED MAY 28, 1907.
O. F. FORSBERG & J. A. BIRSFIELD.
SIGNALING KEY.
APPLICATION FILED OCT. 27, 1902.

6 SHEETS—SHEET 2.

Witnesses:
J. W. Shinkle.
W. H. Leach

Inventors:
Oscar F. Forsberg,
Jules A. Birsfield,
By Frank P. Barton
Attorney.

No. 855,168. PATENTED MAY 28, 1907.
O. F. FORSBERG & J. A. BIRSFIELD.
SIGNALING KEY.
APPLICATION FILED OCT. 27, 1902.

6 SHEETS—SHEET 3.

Witnesses:
J. H. Skinkle
W. H. Leach

Inventors:
Oscar F. Forsberg.
Jules A. Birsfield.
By [signature]
Attorney.

No. 855,168. PATENTED MAY 28, 1907.
O. F. FORSBERG & J. A. BIRSFIELD.
SIGNALING KEY.
APPLICATION FILED OCT. 27, 1902.

6 SHEETS—SHEET 4.

Witnesses:
J.H.Skinkle.
W.W.Leach

Inventors:
Oscar F. Forsberg,
Jules A. Birsfield,
By George P. Barton
Attorney.

No. 855,168. PATENTED MAY 28, 1907.
O. F. FORSBERG & J. A. BIRSFIELD.
SIGNALING KEY.
APPLICATION FILED OCT. 27, 1902.

6 SHEETS—SHEET 5.

Witnesses:
J. H. Skinkle
W. H. Leach

Inventors:
Oscar F. Forsberg,
Jules A. Birsfield,
By George A. Barton
Attorney.

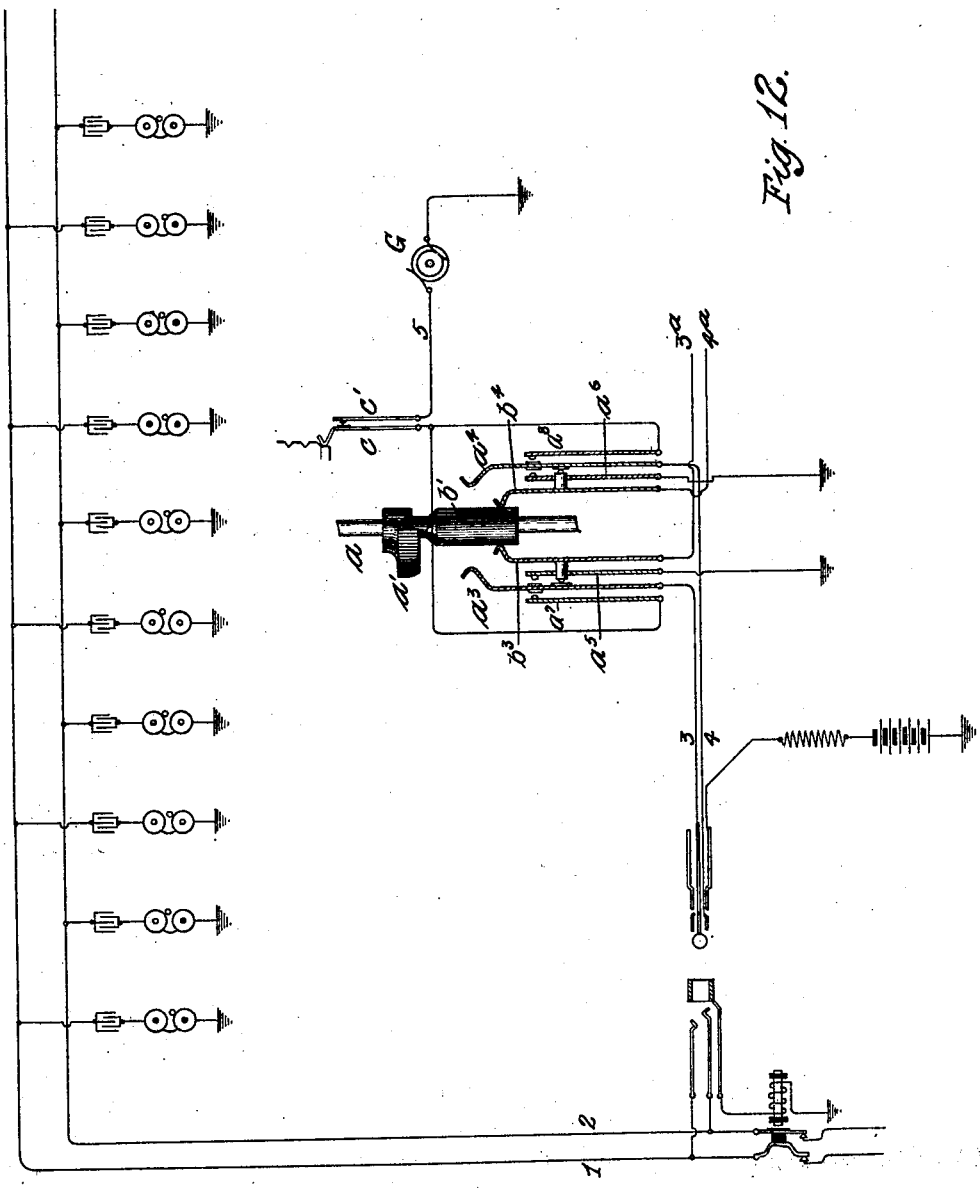

UNITED STATES PATENT OFFICE.

OSCAR F. FORSBERG AND JULES A. BIRSFIELD, OF CHICAGO, ILLINOIS, ASSIGNORS TO WESTERN ELECTRIC COMPANY, OF CHICAGO, ILLINOIS, A CORPORATION OF ILLINOIS.

SIGNALING-KEY.

No. 855,168.  Specification of Letters Patent.  Patented May 28, 1907.

Application filed October 27, 1902. Serial No. 128,871.

*To all whom it may concern:*

Be it known that we, OSCAR F. FORSBERG and JULES A. BIRSFIELD, citizens of the United States, residing at Chicago, in the county of Cook and State of Illinois, have invented a certain new and useful Improvement in Signaling-Keys, of which the following is a full, clear, concise, and exact description.

Our invention relates to a signaling key for telephone switchboards. Where a number of substation telephone instruments are connected on a single circuit or "party line" it is not uncommon to signal the individual stations from the central office switchboard by sending out current to ring all the bells at once but according to a certain understood code—that is to say, a long ring for one station, a short ring for another, two short rings for another and so on.

We have devised an improved key which when initially set by the operator will thereafter act automatically and accurately to transmit any desired signal, whether that signal be a mere arbitrary number of rings or a "code" of long and short rings to follow one another in a given sequence.

In the key of our invention a number of transmitter members are arranged so that any one of them may be brought into operative relation to the switch that applies the signaling current, and motor mechanism is provided which may be set by the attendant to effect the operation of the transmitting device, whereby any one of the predetermined signals may be sent, dependent upon the particular transmitter member which has been selected. Preferably, the transmitter members are toothed bars disposed longitudinally upon a sliding cylinder or drum which is moved longitudinally by means of a suitably-mounted plunger. In the operation of the device the rotation of the plunger rotates the cylinder to bring a particular one of the toothed transmitter bars into operative relation to a contact spring which controls the application of ringing current. Then when the cylinder has been depressed, the motor mechanism (which is provided with an escapement) slowly returns said cylinder to its normal position, and in its journey the teeth of the particular transmitter-bar selected are brought one after another into engagement with the switch spring, causing the latter to move to and fro to make and break the circuit. The signal transmitted is thus dependent upon the particular transmitter member brought into play, which was initially determined by rotating the plunger through a given arc.

Figure 2:
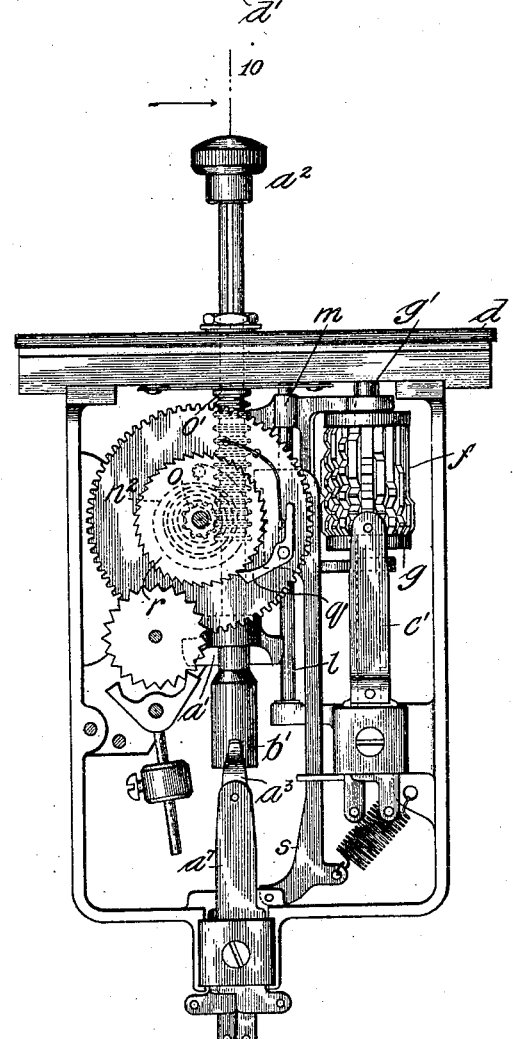
Figure 3:
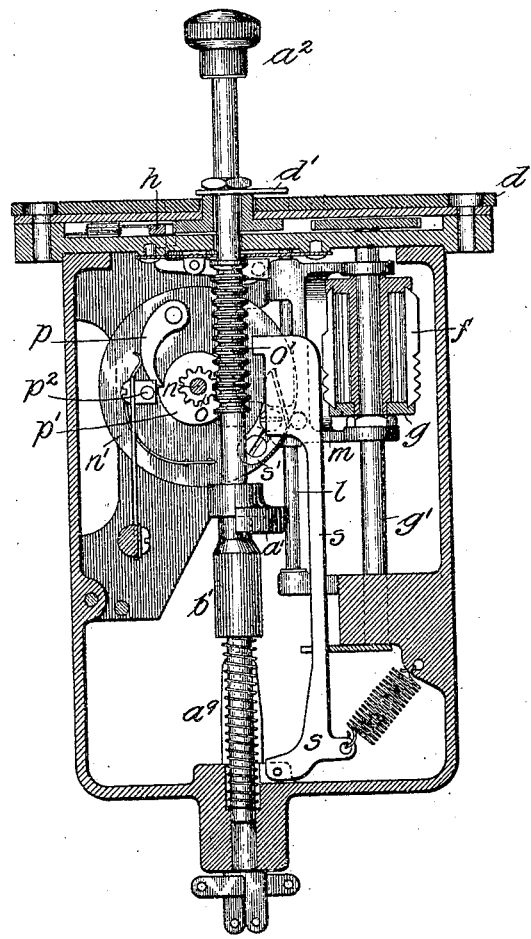
Figure 4:
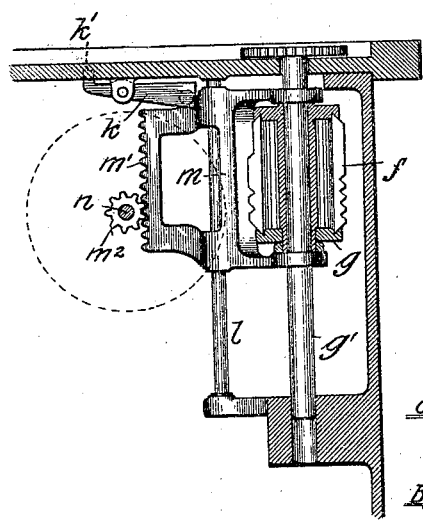
Figure 5:
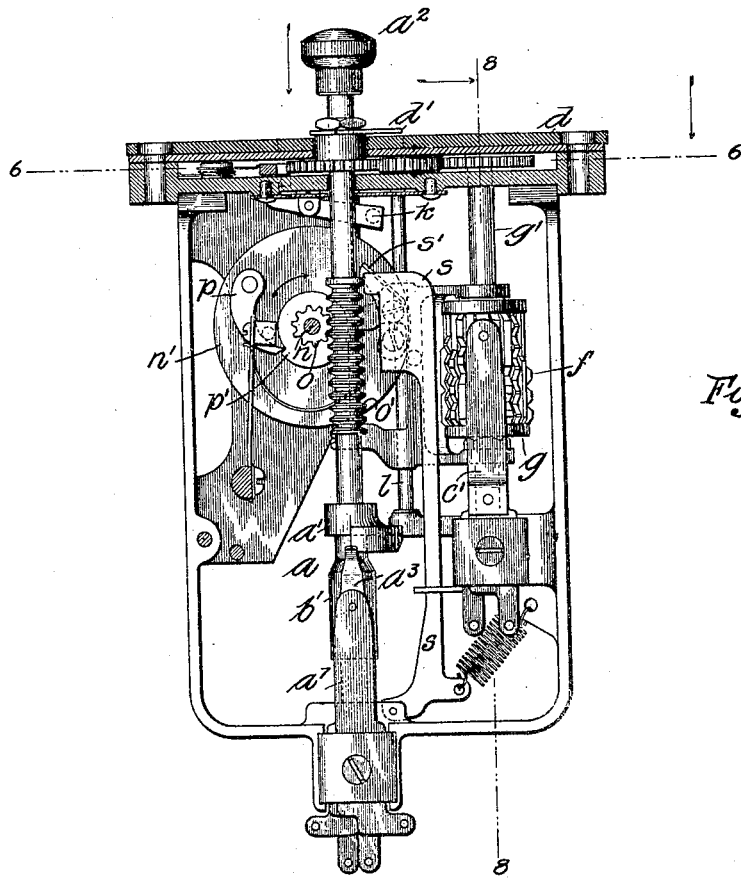
Figure 6:
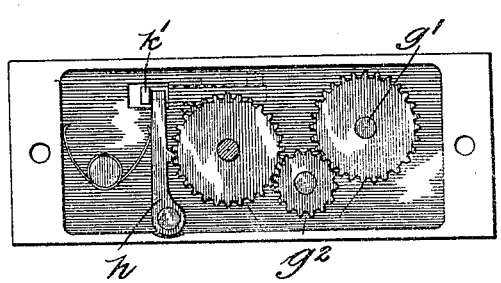
Figure 7:
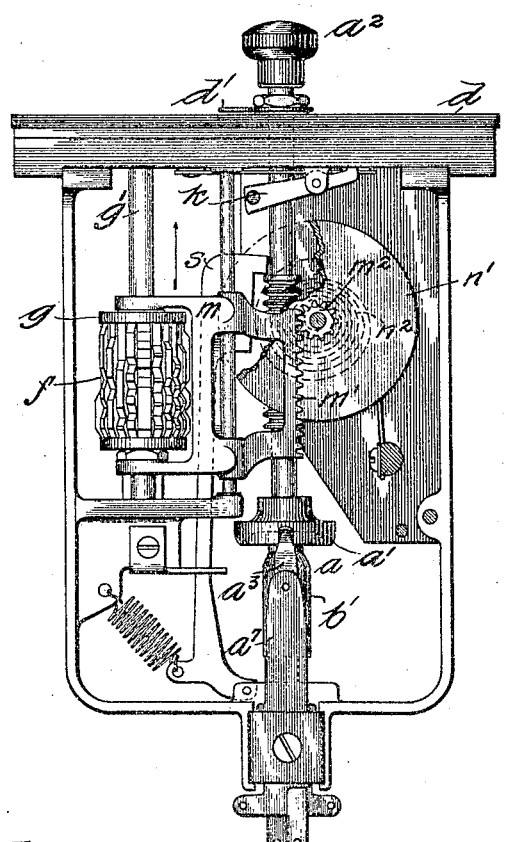
Figure 8:
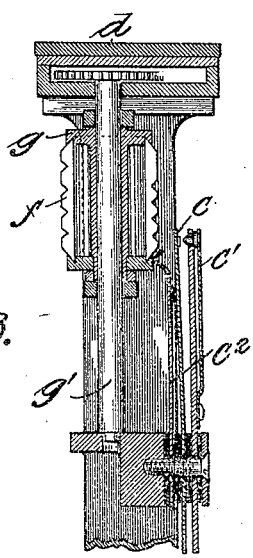
Figure 9:
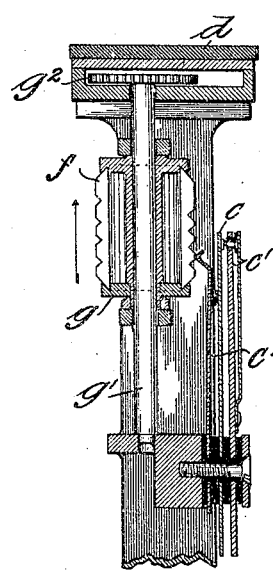
Figure 10:
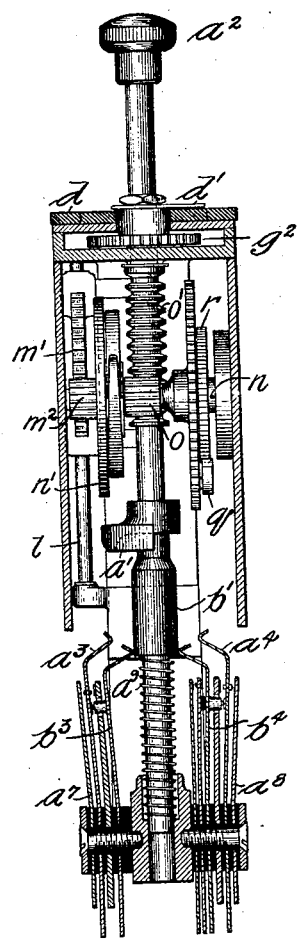
Figure 11:
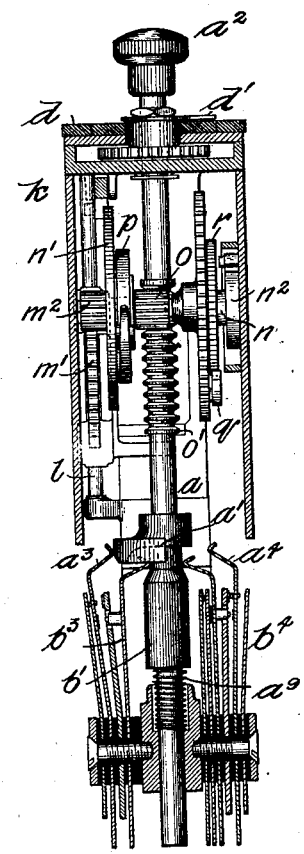

The key of our invention will be particularly described and further features thereof explained in detail by reference to the accompanying drawings, in which Figure 1 is a plan view of the key as seen by the operator; Fig. 2 is a side elevation thereof, looking from the left hand side; Fig. 3 is a sectional elevation; Fig. 4 is a detail sectional view of the traveling transmitter drum and associated parts; Fig. 5 is a view similar to Fig. 3 showing the plunger partially depressed; Fig. 6 is a sectional plan view on line 6—6 of Fig. 5, showing the gearing for rotating the transmitter drum; Fig. 7 is an elevation partly in section of the key as seen from the right hand side, showing the plunger fully depressed; Fig. 8 is a detail sectional view on line 8—8 of Fig. 5. Fig. 9 is a view similar to Fig. 8 but showing the transmitter drum in an intermediate position. Fig. 10 is a vertical transverse section on line 10—10 of Fig. 2. Fig. 11 is a similar view showing the plunger depressed. Fig. 12 is a circuit diagram illustrating how the key shown in Figs. 1—11 may be connected for use with an operator's cord circuit, to signal any one of ten stations of a party line.

The same letters of reference are used to designate the same parts wherever they are shown.

Referring first to the diagram Fig. 12, to illustrate the application of the invention, a metallic circuit telephone line 1 2 is indicated, extending from ten substations (five bells on each side of the line) to a spring jack terminal at a central office, where connection may be made with the line by means of the operator's plug and cord circuit. The two strands of the cord circuit are connected respectively to a pair of contact springs $a^3$ $a^4$ of the ringing key, and other springs $b^3$ $b^4$, which are connected with extensions $3^a$ $4^a$ of the cord circuit, and are normally held under tension to make contact with springs $a^3$ $a^4$ respectively so that the cord circuit may normally be electrically continuous. The plunger $a$ of the ringing key carries two insulating pieces $a'$ $b'$ which are adapted to wedge apart the members of each pair of contact springs $a^3$ $a^4$ and $b^3$ $b^4$ respectively. Normally the piece $b'$ holds springs $b^3$ $b^4$ in engagement with springs $a^3$ $a^4$, and these latter are thus also held away from their resting contact anvils $a^5$ $a^6$, which are grounded. The free pole of a grounded generator G is connected by a conductor 5 through controlling switch contacts $c$ $c'$ with the alternate contact anvils $a^7$ $a^8$ of springs $a^3$ $a^4$ respectively. When plunger $a$ is depressed, a narrower portion of the insulating piece $b'$ is brought between springs $b^3$ $b^4$ so that these springs move toward one another, breaking contact with springs $a^3$ $a^4$ respectively. The depression of the plunger also brings the periphery of the insulating sector-shaped wedge $a'$ into engagement with one or the other of the springs $a^3$ $a^4$, dependent upon the position of rotation of the plunger; and the spring so engaged is thrust out into contact with its alternate anvil, which is connected with generator. The other spring of the pair is allowed to contact with its grounded resting anvil. In short, the depression of the plunger $a$ interrupts the cord circuit, grounds one side of the circuit and connects the other side to the calling generator, thus ringing out on one side or the other of the line dependent upon which of the springs $a^3$ $a^4$ has been engaged by the wedge piece $a'$. During the depression of the plunger the application of the ringing current is controlled by the switch contacts $c$ $c'$, and we will now proceed to describe the mechanism of our invention by which these contacts may be opened and closed automatically to send any desired signal.

The key as seen by the operator appears as shown in Fig. 1. The plunger which is mounted in bearings so that it may both rotate axially and slide longitudinally, projects through the dial plate $d$ and is furnished with a knob or button $a^2$ by which it may be manipulated. It also carries a pointer which indicates its angular position upon the dial.

In a suitable framework below the dial plate—that is, below the switchboard table, is the mechanism of the key. The lower part of the framework supports the main switch springs $a^3$ $a^4$ etc. in position to be actuated by the insulating collar $b'$ and sector-shaped wedge piece $a'$ which are carried by the plunger. A compression-spring $a^9$ encircles the lower portion of the plunger, and being confined between the framework or bearing and the lower edge of the collar $b'$, serves to yieldingly maintain the plunger in an elevated position.

The signal-producing switch springs $c$ $c'$ are provided with an actuating spring or lever $c^2$, the end whereof is positioned to be engaged by the transmitter members $f$, which are shown as toothed bars carried upon a cylinder $g$. Said cylinder is mounted to slide longitudinally upon a vertical shaft $g'$, and also rotates with said shaft. The toothed transmitter bars are disposed longitudinally on the sides of the cylinder, so that by rotating the cylinder any one of said transmitter bars may be brought into operative relation to the actuating spring $c^2$ of the signaling switch. Then as the cylinder is slid along the shaft $g'$, the teeth of the selected transmitter bar one after the other engage the projecting end of the spring $c^2$, whereby the spring $c$ is caused to make and break contact with its anvil $c'$. A long tooth of course, causes the contact to be maintained for a little time, while said tooth is passing, while a short tooth causes only a momentary contact. Any desired "code" signal of long and short rings may thus be produced by a transmitter bar having corresponding teeth.

Figs. 5 and 6 show the gearing $g^2$ which connects the plunger $a$ with the shaft $g'$, so that the two rotate together, the indicator $d'$ carried by the plunger thus showing the angular position of the cylinder—that is, showing which transmitter bar is in operative relation to the controlling switch.

A spring-actuated click lever $h$, shown most clearly in Fig. 6, has a tooth which engages the teeth of the gear wheel upon the plunger shaft, so that as the plunger is rotated it will move a full step at a time and come to rest naturally in the proper position to bring the appropriate transmitter bar fully in line with the spring $c^2$ which it is to actuate. To prevent the plunger from being rotated while depressed a dog $k'$ is carried by a rocking lever $k$ which normally tends to thrust said dog into the path of the click lever. The sliding cylinder $g$ is mounted to travel with a sliding carriage $m$, and when said carriage is at the upper end of its journey a portion thereof engages a pin carried by the rocking lever $k$ and moves said lever to withdraw the dog $k'$ from the path of the click lever and leave the latter free to vibrate.

The carriage $m$ of the transmitter cylinder is arranged to be depressed by the depression of the plunger and then slowly returned to its normal position by mechanism which we shall now proceed to describe.

The transmitter carriage is mounted to slide up and down on a vertical rod $l$, and carries a rack bar $m'$ which is engaged by a pinion $m^2$ fixed upon a shaft $n$. A coiled spring $n^2$ acting upon said shaft $n$ yieldingly maintains the carriage $m$ at the upper end of its journey, the spring being wound up when the shaft $n$ is rotated in a direction to depress the carriage. The rotation of the shaft $n$ is brought about by means of a pinion $o$ carried thereon and meshing with a rack $o'$ carried by the plunger $a$. In order that the transmitter carriage may be returned independent of the plunger, the latter being held depressed until the former has finished its upward journey, the pinion $o$ is not fixed upon the shaft $n$ but is loosely mounted thereon and motion is transmitted from said pinion to the shaft through the agency of a pawl $p$ and cam plate $p'$. The pawl is pivoted to a disk $n'$ fixed upon the shaft $n$, and the cam plate $p'$, which is in effect a ratchet wheel of one tooth, is fixed to the pinion $o$ and arranged to rotate therewith loosely upon the shaft. The rack $o'$ carried by the plunger is adapted to engage the pinion whatever the angular position of said plunger, and may be formed as shown of a series of teeth each one of which extends clear around the plunger, the teeth thus forming a series of beads or annular enlargements upon the plunger.

As the plunger is depressed the rack $o'$ rotates pinion $o$ and cam plate $p'$; this latter engages pawl $p$ mounted on the disk $n'$ which is fixed upon the shaft $n$, so that said shaft is rotated, winding up the coiled spring and acting through pinion $m^2$ and rack bar $m'$ to depress the transmitter carriage $m$. As the plunger reaches the bottom of its journey, the disk $n'$ reaches a position of rotation such that the pawl $p$ is engaged by a pin $p^2$ projecting into its path, and is raised from the notch of the cam plate $p'$ whereby the shaft $n$ is released and rendered independent of the plunger, so that though the plunger remains depressed the transmitter carriage is returned to its normal position. To retard this upward movement of the transmitter carriage an escapement is provided, consisting of a clock train which is connected by means of a pawl and ratchet wheel $r$ with the shaft $n$. When the shaft is rotated in depressing the plunger the pawl $q$ on the main wheel of the clock train slides over the teeth of the ratchet wheel without moving the clock train, but the opposite rotation of the shaft in elevating the transmitter carriage is effected against the resistance of the escapement, the teeth of the ratchet wheel $r$ engaging the pawl of the clock train to move the same. A detent lever $s$ engages a shoulder on the plunger $a$ and holds said plunger depressed until the transmitter carriage has been returned to its normal position. Toward the end of the upward travel, as the disk $n'$ approaches the limit of its backward rotation, a cam $s'$ carried thereby engages the detent lever and moves the same out to release the plunger, whereupon the latter is returned quickly to its normal elevated position by the spring $a^2$.

To review briefly the operation, the rotation of the plunger $a$ rotates the cylinder $g$, whereby any desired one of the transmitter bars $f$ may be brought into operative relation to the switch-operating spring finger $c^2$, the particular bar selected being indicated by the position of the pointer on the dial $d$. Then a depression of the plunger depresses the cylinder $g$ and as the lower end of its journey is reached the main switch springs $a^3$ $a^4$ $b^3$ $b^4$ are actuated, so that the application of ringing current to the circuit is brought under the control of the switch $c$ $c'$; at the same time the shaft $n$ is released and begins to be rotated by the spring to return the transmitter carriage to its normal position, the movement being retarded by the clock train. During the upward travel of the cylinder carriage, the previously selected transmitter bar actuates the contact springs $c$ $c'$, and thus causes the sending of a signal, the character of said signal being dependent upon the teeth of the transmitter bar in question. The plunger is held down and locked against rotation during the transmission of the signal, but finally is released and returned to its normal position.

Having now described the preferred embodiment of our invention we claim as new, and desire to secure by Letters Patent the following:

1. In a ringing key for telephone switchboards, the combination with a switch adapted to control the application of ringing current, of a number of transmitter members for determining the actuation of said switch, selecting mechanism whereby any one of said transmitter members may be brought into operative relation to the switch, and motor mechanism arranged to operate the switch through the agency of the selected transmitter.

2. In a key, the combination with a switch, of a number of distinctive signal transmitters, a plunger adapted in its rotation to bring any of said transmitters and the switch into operative correlation, said plunger being adapted in a longitudinal movement to cause the coöperation of the selected transmitter with the switch to produce a distinctive signal.

3. The combination with a signal switch, of a transmitter cylinder independent of the circuit of said switch, and a series of transmitter members carried by said cylinder and arranged to be selected or brought into operative relation to the signal switch by the relative rotation of the cylinder, the transmitter so selected being caused to engage and operate the signal switch by the relative longitudinal movement of the cylinder.

4. In a key, the combination with a rotatable and longitudinally-movable plunger, of a main switch operated by the depression of the plunger, a subsidiary switch adapted when operated to produce signals in the circuit governed by said main switch, a number of transmitter members for determining the actuation of said subsidiary switch, any one of said transmitter members being brought into operative relation to the switch by the rotation of the plunger, a motor mechanism set in operation by the depression of the plunger, adapted to bring the subsidiary switch and the selected transmitter member into active co-operation in the transmission of a signal and mechanism for retaining the plunger during the operation of the transmitting mechanism.

5. In a ringing key the combination with a switch for controlling the application of ringing current, of a series of transmitter members, said members being adapted to be selected or brought into operative relation to the switch, a longitudinally movable plunger, motor mechanism set in the depression of the plunger adapted to effect a movement of the selected transmitter member to operate said switch, and means actuated by the plunger at the end of its downward movement adapted to release said motor mechanism.

6. In a ringing key, the combination with a transmitter for controlling the application of ringing current, said transmitter comprising a switch and a transmitter member adapted to engage the switch to determine its operation, of a longitudinally-movable plunger adapted in its depression to effect a relative movement of the switch and transmitter member, motor mechanism set in the depression of the plunger, means actuated by the plunger at the end of its downward movement to release the motor mechanism to effect a reverse relative movement of the switch and transmitter member, and mechanism also actuated by the plunger at the end of its downward movement operating to establish an operative condition of the transmitter only during the reverse relative movement of the switch and transmitter member.

7. In a ringing key, the combination with a subsidiary switch for controlling the application of ringing current to a line, of a transmitter cylinder, a series of transmitter members carried by said cylinder and arranged to be brought selectively into operative relation to the subsidiary switch by the relative rotation of the cylinder and to actuate said switch by a relative longitudinal movement of the cylinder, a rotatable and longitudinally movable plunger adapted in its rotation to effect a rotation of the cylinder and in its depression to effect a longitudinal movement of the cylinder, motor mechanism set in the depression of the plunger for effecting a reverse longitudinal movement of the cylinder independent of the plunger, means actuated by the plunger at the end of its downward movement to release said motor mechanism, a catch for holding the plunger depressed during the reverse movement of the cylinder, and a main switch actuated while the plunger is depressed, to establish connection between the aforesaid subsidiary switch and the line.

8. In a ringing key, the combination with a main switch for controlling the application of ringing current to a line, of a plunger adapted when depressed to operate said switch, a transmitter adapted to determine the character of the ringing current applied through the main switch, said transmitter being made operative by the depression of the plunger, a detent lever $s$ for holding the plunger depressed and a cam $s'$ moved against the detent lever in the operation of the transmitter to release the plunger.

9. In a ringing key, the combination with a switch $c$ of a transmitter member $f$ adapted to be moved to actuate said switch, a transmitter carriage $m$, a manually operated plunger for moving said transmitter carriage, clockwork for returning said carriage to its normal position, mechanism for transmitting motion from the plunger to the transmitter carriage as the plunger is depressed, means operated at the end of the downward movement of the plunger to release the transmitter carriage from the plunger, whereby the carriage is allowed to return independently of the plunger, a detent lever $s$ for holding the plunger depressed while the transmitter carriage is returning, and a cam $s'$ actuated by the clockwork to release the plunger at the end of the return movement of the transmitter carriage, substantially as descried.

10. In a ringing key, the combination with a plunger, of a cam plate $n$ rotated by the depression of the plunger, a disk $n'$ and mechanism for coupling the cam plate with the disk while the plunger is being depressed, a device $p^2$ operating to disconnect the disk from the cam plate when the plunger reaches the limit of its downward movement, clockwork for causing a reverse rotation of the disk to return it to its normal position, a detent lever $s$ operating to hold the plunger depressed, a cam $s'$ carried by the disk $n'$ and adapted to be brought into engagement with detent lever $s$ to effect the release of the plunger as the disk completes its reverse movement, a transmitter member moved in the rotation of the disk, and a ringing switch operated by said transmitter member, substantially as described.

11. In a ringing key the combination with a switch for controlling the application of ringing current, of a series of transmitter members, a support therefor, said members being adapted to be selected or brought into operative relation to the switch, a longitudinally-movable plunger, motor mechanism set in the depression of the plunger adapted to effect a movement of said transmitter support, the selected transmitter member as the support is moved operating said switch, and means actuated by the plunger at the end of its downward movement adapted to release said motor mechanism.

12. The combination with a signal switch, of a cylinder, a series of transmitter members carried thereby, and a rotatable plunger adapted to rotate said cylinder and bring any one of said transmitter members individually into operative relation to the switch, said plunger being adapted when moved longitudinally to effect a longitudinal movement of the cylinder and cause the selected transmitter member to operate said switch.

13. In a ringing key for telephone switchboards, the combination with a switch adapted to control the application of ringing current, of a number of transmitter members for actuating said switch, a plunger adapted when rotated to bring any individual transmitter member into operative relation to the switch, and motor mechanism set by said plunger in its longitudinal movement, adapted to operate the switch through the agency of the selected transmitter.

In witness whereof, we hereunto subscribe our names this 29th day of August A. D., 1902.

OSCAR F. FORSBERG.
JULES A. BIRSFIELD.

Witnesses:
DUNCAN E. WILLETT,
EDWIN H. SMYTHE.